US012684450B2

(12) United States Patent
Kadam et al.

(10) Patent No.: US 12,684,450 B2
(45) Date of Patent: Jul. 14, 2026

(54) EXTENDING LOCAL CELLULAR WAN CAPABILITIES TO A CONNECTED DEVICE

(71) Applicant: Palo Alto Networks, Inc., Santa Clara, CA (US)

(72) Inventors: Avaneesh Anandrao Kadam, Sunnyvale, CA (US); Mukhtiar A. Shaikh, San Jose, CA (US); Jeslin Antony Puthenparambil, San Jose, CA (US); Arun Athrey Chandrasekaran, Milpitas, CA (US); Madhusudana Rao Kata, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 440 days.

(21) Appl. No.: 18/224,959

(22) Filed: Jul. 21, 2023

(65) Prior Publication Data

US 2025/0031124 A1      Jan. 23, 2025

(51) Int. Cl.
*H04W 40/02* (2009.01)
*H04W 12/088* (2021.01)
*H04W 88/06* (2009.01)

(52) U.S. Cl.
CPC ......... *H04W 40/02* (2013.01); *H04W 12/088* (2021.01); *H04W 88/06* (2013.01)

(58) Field of Classification Search
CPC .... H04W 40/02; H04W 12/088; H04W 88/06
See application file for complete search history.

(56) References Cited

U.S. PATENT DOCUMENTS

2019/0104111 A1     4/2019 Cidon
2019/0140890 A1*    5/2019 Mayya ................ H04L 41/0654

2019/0238483 A1*   8/2019 Marichetty ......... H04L 61/4552
2019/0342426 A1*  11/2019 Momchilov ........... G06F 9/544
2020/0195557 A1     6/2020 Duan
2022/0006756 A1*   1/2022 Ramaswamy ...... H04L 47/2441
2022/0209990 A1*   6/2022 Dillon ................ H04L 12/2869

OTHER PUBLICATIONS

Gordeychik et al., SD-WAN Threat Landscape, Nov. 12, 2018.
Michael Wood, Top Requirements on the SD-WAN Security Checklist, Network Security, Jul. 2017, pp. 9-11.
Raghavan Kasturi Rangan, Trends in SD-WAN and SDN, CSIT (Mar. 2020) 8(1):21-27, Special Issue on SDN, Published online Apr. 22, 2020.

* cited by examiner

*Primary Examiner* — Brenda H Pham
(74) *Attorney, Agent, or Firm* — Van Pelt, Yi & James LLP

(57) ABSTRACT

Techniques for extending local cellular WAN capabilities to a connected device are disclosed. In some embodiments, a system, a process, and/or a computer program product for extending local cellular wide area network (WAN) capabilities to a connected device includes selecting a first network communication device associated with a software-defined wide area network (SD-WAN) for policy enforcement, wherein the policy enforcement includes SD-WAN path selection; monitoring cellular network status information associated with a second network communication device of the SD-WAN; and synchronizing the cellular network status information associated with the second network communication device of the SD-WAN with the first network communication device associated with the SD-WAN, wherein the first network communication device associated with the SD-WAN uses the network status information for the policy enforcement.

20 Claims, 10 Drawing Sheets

402

```
Wasp_HA_A#
Wasp_HA_A# tcpdump cellular1 args=icmp show
tcpdump: verbose output suppressed, use -v or -vv for full protocol decode
listening on cellular1, link-type EN10MB (Ethernet), capture size 262144 bytes
20:13:27.367067 IP 192.168.6.26 > 1.1.1.1: ICMP echo request, id 19066, seq 1, length 64
20:13:27.367158 IP 192.168.6.26 > 1.1.1.1: ICMP echo request, id 19066, seq 1, length 64
20:13:27.397607 IP 1.1.1.1 > 192.168.6.26: ICMP echo reply, id 19066, seq 1, length 64
20:13:27.397748 IP 1.1.1.1 > 192.168.6.26: ICMP echo reply, id 19066, seq 1, length 64
20:13:28.368900 IP 192.168.6.26 > 1.1.1.1: ICMP echo request, id 19066, seq 2, length 64
20:13:28.368961 IP 192.168.6.26 > 1.1.1.1: ICMP echo request, id 19066, seq 2, length 64
20:13:28.416808 IP 1.1.1.1 > 192.168.6.26: ICMP echo reply, id 19066, seq 2, length 64
20:13:28.416883 IP 1.1.1.1 > 192.168.6.26: ICMP echo reply, id 19066, seq 2, length 64
20:13:29.370901 IP 192.168.6.26 > 1.1.1.1: ICMP echo request, id 19066, seq 3, length 64
20:13:29.370954 IP 192.168.6.26 > 1.1.1.1: ICMP echo request, id 19066, seq 3, length 64
20:13:29.416821 IP 1.1.1.1 > 192.168.6.26: ICMP echo reply, id 19066, seg 3, length 64
20:13:29.416888 IP 1.1.1.1 > 192.168.6.26: ICMP echo reply, id 19066, seg 3, length 64
20:13:30.372853 IP 192.168.6.26 > 1.1.1.1: ICMP echo request, id 19066, seq 4, length 64
20:13:30.372918 IP 192.168.6.26 > 1.1.1.1: ICMP echo request, id 19066, seq 4, length 64
20:13:30.416831 IP 1.1.1.1 > 192.168.6.26: ICMP echo reply, id 19066, seq 4, length 64
20:13:30.416901 IP 1.1.1.1 > 192.168.6.26: ICMP echo reply, id 19066, seq 4, length 64
20:13:31.374923 IP 192.168.6.26 > 1.1.1.1: ICMP echo request, id 19066, seq 5, length 64
20:13:31.374984 IP 192.168.6.26 > 1.1.1.1: ICMP echo request, id 19066, seq 5, length 64
20:13:31.416867 IP 1.1.1.1 > 192.168.6.26: ICMP echo reply, id 19066, seq 5, length 64
20:13:31.416928 IP 1.1.1.1 > 192.168.6.26: ICMP echo reply, id 19066, seq 5, length 64

^C
20 packets captured
20 packets received by filter
0 packets dropped by kernel
Wasp_HA_A# tcpdump 2 args=icmp show
tcpdump: verbose output suppressed, use -v or -vv for full protocol decode
listening on e501, link-type EN10MB (Ethernet), capture size 262144 bytes
20:13:38.693138 IP 192.168.6.18 > 8.8.8.8: ICMP echo request, id 19067, seq 1, length 64
20:13:38.693396 IP 192.168.6.18 > 8.8.8.8: ICMP echo request, id 19067, seq 1, length 64
20:13:38.738994 IP 8.8.8.8 > 192.168.6.18: ICMP echo reply, id 19067, seq 1, length 64
20:13:38.739074 IP 8.8.8.8 > 192.168.6.18: ICMP echo reply, id 19067, seq 1, length 64
20:13:39.694458 IP 192.168.6.18 > 8.8.8.8: ICHP echo request, id 19067, seq 2, length 64
20:13:39.694538 IP 192.168.6.18 > 8.8.8.8: ICMP echo request, id 19067, seq 2, length 64
20:13:39.738084 IP 8.8.8.8 > 192.168.6.18: ICMP echo reply, id 19067, seg 2, length 64
20:13:39.738123 IP 8.8.8.8 > 192.168.6.18: ICMP echo reply, id 19067, seq 2, length 64
20:13:40.695578 IP 192.168.6.18 > 8.8.8.8: ICMP echo request, id 19067, seq 3, length 64
20:13:40.695724 IP 192.168.6.18 > 8.8.8.8: ICMP echo request, id 19067, seq 3, length 64
20:13:40.738023 IP 8.8.8.8 > 192.168.6.18: ICMP echo reply, id 19067, seq 3, length 64
20:13:40.738067 IP 8.8.8.8 > 192.168.6.18: ICMP echo reply, id 19067, seq 3, length 64
20:13:41.697561 IP 192.168.6.18 > 8.8.8.8: ICMP echo request, id 19067, seq 4, length 64
20:13:41.697643 IP 192.160.6.18 > 0.0.0.0: ICMP echo request, id 19067, seq 4, length 64
20:13:41.738010 IP 8.8.8.8 > 192.168.6.18: ICMP echo reply, id 19067, seq 4, length 64
20:13:41.738085 IP 8.8.8.8 > 192.168.6.18: ICMP echo reply, id 19067, seq 4, length 64
20:13:42.699415 IP 192.168.6.18 > 8.0.0.0: ICMP echo request, id 19067, seq 5, length 64
20:13:42.699501 IP 192.168.6.18 > 8.8.8.8: ICHP echo request, id 19067, seq 5, length 64
20:13:42.732044 IP 8.8.8.8 > 192.168.6.18: ICMP echo reply, id 19067, seq 5, length 64
20:13:42.732153 IP 8.8.8.8 > 192.168.6.18: ICMP echo reply, id 19067, seq 5, length 64
^C
20 packets captured
20 packets received by filter
0 packets dropped by kernel
1 packet dropped by interface
Wasp HA_AI dump spoke-ha status
Active           : true
Peer Connected   : true
Base Priority    : 250
```

```
Wasp_HA_B#  tcpdump cellular2 args-icmp show
tcpdump: verbose output suppressed, use -v or -vv for full protocol decode
listening on cellular2, link-type EN10MB (Ethernet), capture size 262144 bytes
20:13:38.678575 IP 192.168.6.18 > 8.8.8.8: ICMP echo request, id 19067, seq 1, length 64
20:13:38.723988 IP 8.8.8.8 > 192.168.6.18: ICMP echo reply, id 19067, seq 1, length 64
20:13:39.679692 IP 192.168.6.18 > 8.8.8.8: ICMP echo request, id 19067, seq 2, length 64
20:13:39.723085 IP 8.8.8.8 > 192.168.6.18: ICMP echo reply, id 19067, seq 2, length 64
20:13:40.680871 IP 192.168.6.18 > 8.8.8.8: ICMP echo request, id 19067, seq 3, length 64
20:13:40.723030 IP 8.8.8.8 > 192.168.6.18: ICMP echo reply, id 19067, seq 3, length 64
20:13:41.682787 IP 192.168.6.18 > 8.8.8.8: ICMP echo request, id 19067, seq 4, length 64
20:13:41.723007 IP 8.8.8.8 > 192.168.6.18: ICMP echo reply, id 19067, seq 4, length 64
20:13:42.684643 IP 192.168.6.18 > 8.8.8.8: ICMP echo request, id 19067, seq 5, length 64
20:13:42.717046 IP 8.8.8.8 > 192.168.6.18: ICMP echo reply, id 19067, seq 5, length 64
^C
10 packets captured
10 packets received by filter
0 packets dropped by kernel
Wasp_HA_B# dump spoke-ha status
Active               : false
Peer Connected       : true
Base Priority        : 225
Effective Priority   : 225
Updated              : 2023-04-03 20:07:57.219 (6mls ago)
Wasp_HA_B#
```

Management Plane

552
I/F Communicator

550
Policies

532

Data Plane

534

542 — APP ID

544 — Decoder

540 — SSL Decryption

546 — SSL Encryption

538 — Flow

548 — Forward

Network Processor
536

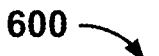

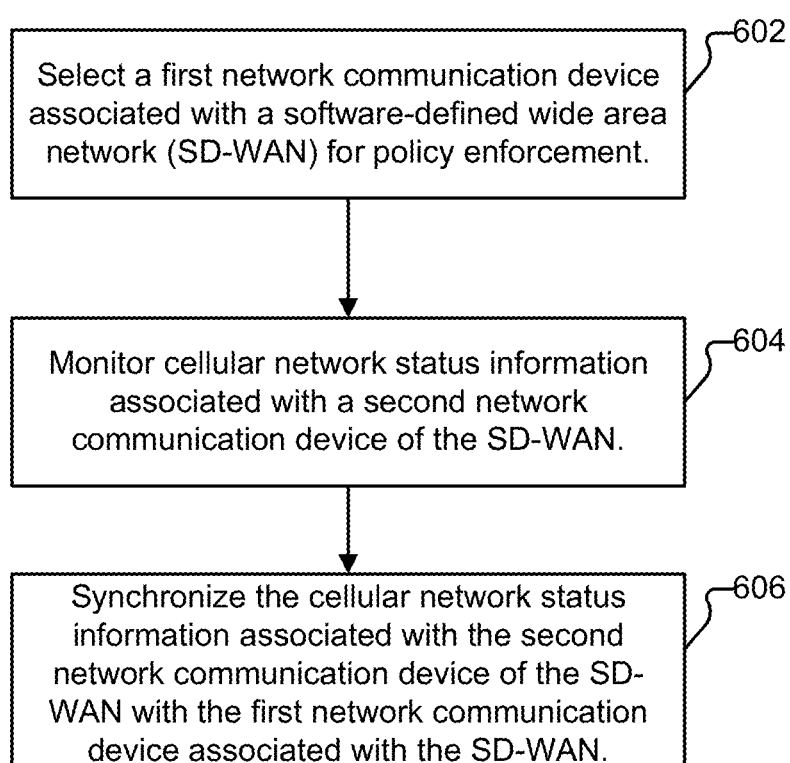

600

Select a first network communication device associated with a software-defined wide area network (SD-WAN) for policy enforcement. ⟍602

Monitor cellular network status information associated with a second network communication device of the SD-WAN. ⟍604

Synchronize the cellular network status information associated with the second network communication device of the SD-WAN with the first network communication device associated with the SD-WAN. ⟍606

FIG. 6

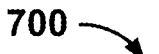

700 ⎯⬎

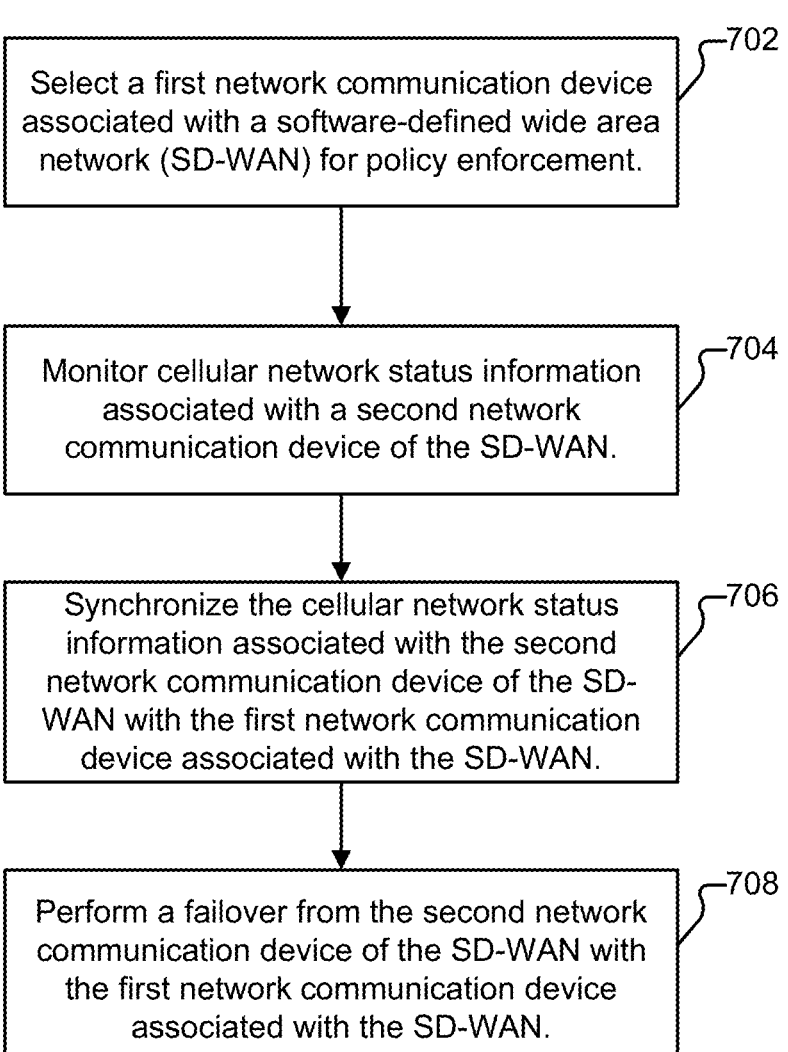

Select a first network communication device associated with a software-defined wide area network (SD-WAN) for policy enforcement. ⎯702

Monitor cellular network status information associated with a second network communication device of the SD-WAN. ⎯704

Synchronize the cellular network status information associated with the second network communication device of the SD-WAN with the first network communication device associated with the SD-WAN. ⎯706

Perform a failover from the second network communication device of the SD-WAN with the first network communication device associated with the SD-WAN. ⎯708

FIG. 7

EXTENDING LOCAL CELLULAR WAN CAPABILITIES TO A CONNECTED DEVICE

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4 is a screen diagram that illustrates an example scenario for extending local cellular WAN capabilities to a connected device in accordance with some embodiments.

FIG. 6 is a flow diagram illustrating a process for extending local cellular WAN capabilities to a connected device in accordance with some embodiments.

FIG. 7 is another flow diagram illustrating a process for extending local cellular WAN capabilities to a connected device in accordance with some embodiments.

DETAILED DESCRIPTION

Figure 1A:
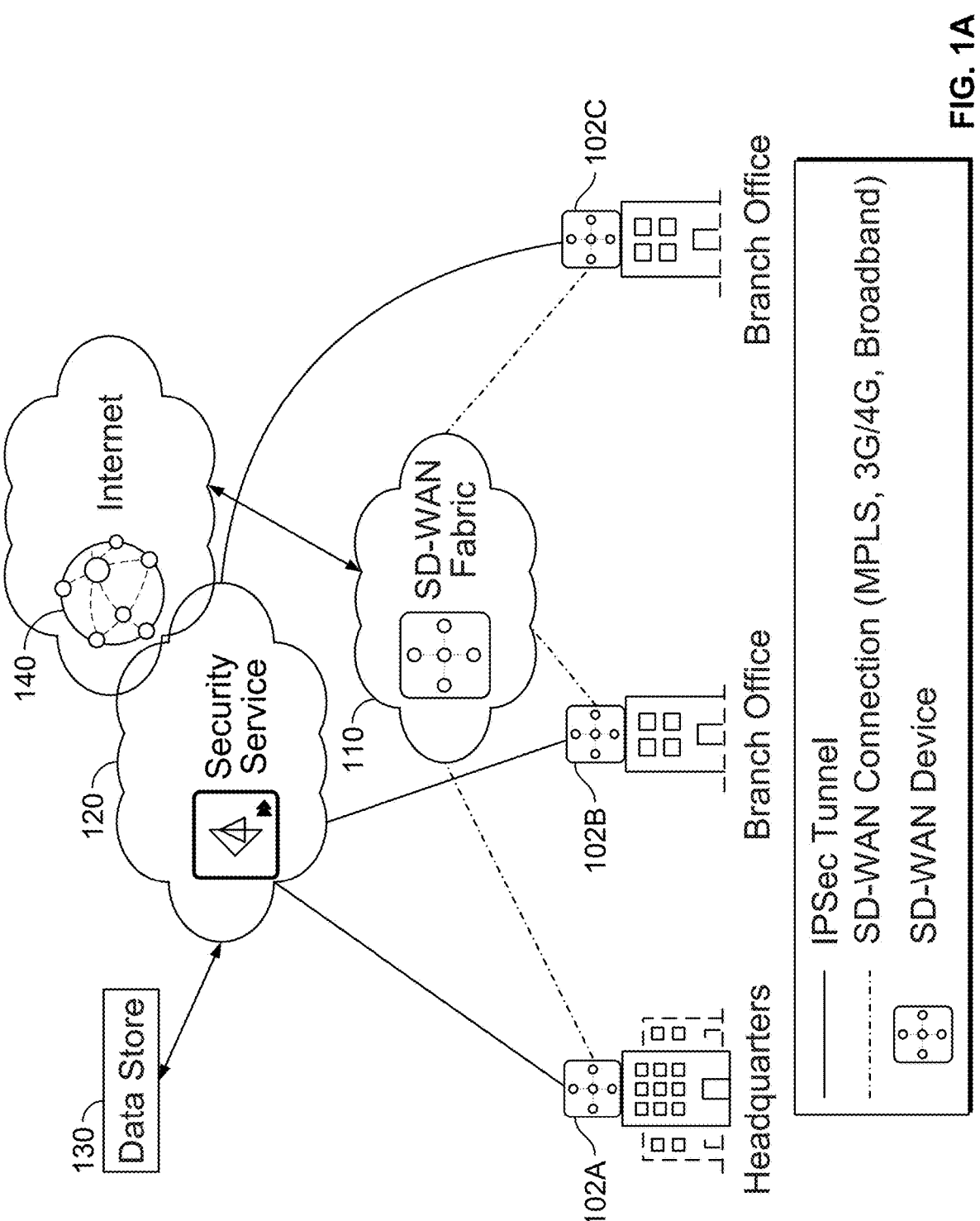
FIGS. 1A-1B are example system environment diagrams including example SD-WAN architectures and a security service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Technical Challenges for Security Solutions in Evolving SD-WAN Environments

Security service providers offer various commercially available cloud-based security solutions including various firewall, VPN, and other security related services. For example, some security service providers have their own data centers in multiple geographies across the world to provide their customers such cloud-based security solutions.

Generally, cloud-based security services are offered by cloud-based security service providers in distinct locations/regions around the world. However, customers (e.g., enterprise customers of a given cloud-based security service provider) may have headquarters, branches, and/or other offices in various locations/regions that are in network communications with each other and the cloud-based security service and Internet using various SD-WAN connections (e.g., over SD-WAN fabric). As a result, the use of such SD-WAN connections facilitates network connectivity and often introduces another layer of security monitoring at each SD-WAN device at each office location (e.g., branches, headquarters, etc.) as well as at the cloud-based security service.

Overview of Techniques for Extending Local Cellular WAN Capabilities to a Connected Device Specifically, cellular WAN in SD-WAN routers often provides a convenient connectivity solution for remote location deployments. Cellular WAN in SD-WAN routers is gaining popularity as a primary WAN connectivity solution for remote location deployments (e.g., 5G cellular WAN in SD-WAN routers in branch deployments for an enterprise). As such, having two cellular service providers/carriers (e.g., AT&T Wireless[SM], Verizon, T-Mobile, and/or other cellular service providers) can provide redundancy for cellular connectivity for cellular WAN in SD-WAN routers as a robust connectivity solution for remote location deployments.

However, dual-radio modem platforms generally increase the cost associated with providing such connectivity solutions (e.g., increasing costs associated with such cellular WAN-based SD-WAN routers for each deployment for a given enterprise). Moreover, creating cellular WAN-based SD-WAN routers with dual radio modems adds complexity and potential spectral interference that can reduce network performance for such cellular WAN-based SD-WAN routers.

As a result, many SD-WAN routers integrate single radio dual-SIM modems to thereby reduce such costs. For example, having two cellular service providers/carriers via two SIMs can provide for additional redundancy for network connectivity and, in some cases, can facilitate higher bandwidth availability. But there are other technical challenges that exist for providing effective and efficient single radio dual-SIM modem solutions for cellular WAN-based SD-WAN routers. As an example, a typical high availability (HA) switchover time between SIMs for such single radio dual-SIM modem solutions for cellular WAN-based SD-WAN routers can require on the order of minutes (e.g., as firmware may need to be downloaded from the second carrier and activated for the second SIM as large cellular carriers typically require use of their distinct firmware as opposed to sharing common firmware, as compared to a typical HA switchover time on the order of seconds for cellular WAN-based SD-WAN routers with dual radio modems).

As such, new and improved techniques are needed for extending local cellular WAN capabilities.

Accordingly, various new and improved techniques for extending local cellular WAN capabilities are disclosed.

Specifically, the disclosed techniques for extending local cellular WAN capabilities facilitate two devices to use their own radio to provide active-active WAN connectivity while maintaining all cellular features, such as SIM switchover (e.g., for an effective and efficient HA switchover for single radio dual-SIM modem solutions for cellular WAN-based SD-WAN routers), GPS, reachability detection, as well as for signal strength related algorithms. As such, one device can utilize the cellular capabilities from another device, as if it is using its own local modem. These and other aspects of the disclosed techniques for extending local cellular WAN capabilities will be further described below with respect to various embodiments.

In some embodiments, a system, a process, and/or a computer program product for extending local cellular wide area network (WAN) capabilities to a connected device includes selecting a first network communication device associated with a software-defined wide area network (SD-WAN) for policy enforcement (e.g., for a cloud security service), wherein policy enforcement includes SD-WAN path selection (e.g., routing/steering of traffic associated with the first network communication device associated with the SD-WAN); monitoring cellular network status information associated with a second network communication device of the SD-WAN; and synchronizing the cellular network status information associated with the second network communication device of the SD-WAN with the first network communication device associated with the SD-WAN, wherein the first network communication device associated with the SD-WAN uses the network status information for policy enforcement.

In some embodiments, a system, a process, and/or a computer program product for extending local cellular WAN capabilities to a connected device further includes synchronizing network status information associated with the first network communication device associated with the SD-WAN with the second network communication device associated with the SD-WAN.

In some embodiments, a system, a process, and/or a computer program product for extending local cellular WAN capabilities to a connected device further includes performing a failover from the second network communication device of the SD-WAN to the first network communication device associated with the SD-WAN.

In some embodiments, a system, a process, and/or a computer program product for extending local cellular WAN capabilities to a connected device further includes performing an SD-WAN path selection based on application/network reachability.

In a first example use case, the first network communication device associated with the SD-WAN and the second network communication device associated with the SD-WAN are a high availability (HA) pair for the SD-WAN, wherein the second network communication device is in a standby mode for the first network communication device, wherein the first network communication device includes a first cellular radio, and wherein the second network communication device includes a second cellular radio.

In a second example use case, the first network communication device associated with the SD-WAN includes a dual SIM and single radio for cellular network access, and wherein the second network communication device associated with the SD-WAN includes a non-cellular network communication access, and wherein the second network communication device can utilize cellular access via the first network communication device, and wherein the SD-WAN path selection is based at least in part on application/network reachability.

Accordingly, the disclosed techniques for extending local cellular WAN capabilities to a connected device facilitate various advantages. For example, this solution allows a device to use another device's cellular modem with many native cellular features, as if the modem is present on the local device. Also, when used in high availability (HA) settings, this solution allows the use of two cellular carriers simultaneously even though a single device only has one radio (e.g., it allows for reusing existing SKUs and the software instead of investing in a new platform with a dual radio). Further, SD-WAN routers on the branch network can take advantage of this mechanism to improve WAN redundancy.

These and other embodiments for extending local cellular WAN capabilities to a connected device will be further described below with respect to various embodiments.

Figure 1B:
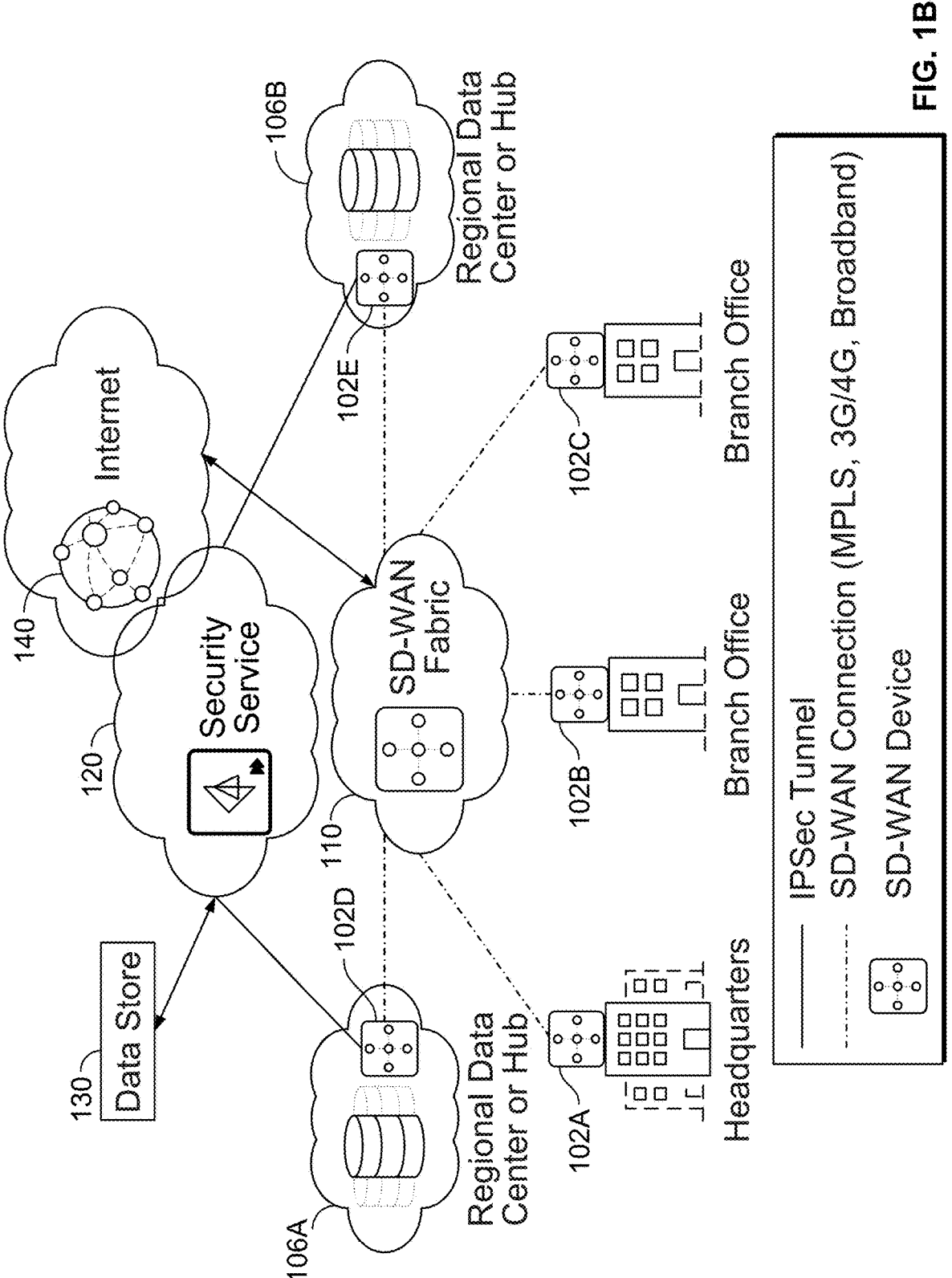

Example System Embodiments for Extending Local Cellular WAN Capabilities to a Connected Device FIGS. 1A-1B are example system environment diagrams including example SD-WAN architectures and a security service in accordance with some embodiments. These example system diagrams generally illustrate a security service for securing branch office and headquarter sites with SD-WAN connections in communication with a security service (e.g., a cloud-based security service).

As organizations grow across different geographical locations, choosing a network becomes a delicate balancing act of cost, performance, and security. A software-defined WAN (SD-WAN) simplifies the management and operation of a WAN by separating the networking hardware (the data plane) from its control mechanism (the control plane). SD-WAN technology allows companies to build higher-performance WANs using lower-cost Internet access. With the adoption of SD-WANs, organizations are increasingly connecting directly to the Internet, introducing security challenges to protect remote networks and mobile users. Additionally, the deployment of Software as a Service (SaaS) applications has significantly increased, with many organizations directly connecting to such cloud-based SaaS applications, introducing additional security challenges. The adoption of SD-WAN technology introduces many benefits in cost savings and enables organizations to be agile and optimized. However, it also makes branch offices and users targets of cyber-attacks and other technical security challenges as similarly described above.

SD-WAN security generally is desired to be as flexible as the networking, but it is also technically challenging to adapt traditional security approaches to such evolving SD-WAN networking in various enterprise network environments such as shown in FIGS. 1A and 1B as will be described below. In a traditional campus network design, there is a full stack of network security appliances at the Internet perimeter that can protect the branch, which is true if all traffic is brought through the core network to pass through such a full stack of network security appliances at the Internet perimeter. However, SD-WANs do not always use this network architecture, such as if the SD-WANs are configured to integrate cloud/SaaS applications.

An alternative to the traditional approach is to deploy network security appliances at the branch office. However, this traditional approach complicates the deployment as it brings the security device/element closer to the branch office.

SD-WAN technology generally uses the principles of software-defined networking (SDN) and separates the control plane and the data plane. Based on this principle, SD-WAN deployments generally include the following components: (1) a controller that administrators use to centrally configure WAN topologies and define traffic path rules; and (2) SD-WAN edge devices, either physical or virtual, that reside at every site and function as the connection and termination points of the SD-WAN fabric.

In an example SD-WAN Type 1 deployment (e.g., branches and headquarters deployment), at each branch site, organizations can deploy one or more SD-WAN edge devices and connect them to form an SD-WAN fabric or SD-WAN overlay. Administrators use the SD-WAN controller, based either in the cloud or on the organization's premises, to manage and configure these edge devices and define the traffic forwarding policies at each site.

Referring to FIG. 1A for an example deployment (e.g., branches, headquarters, and regional data center deployment), the IPSec tunnels are set up between each of the SD-WAN edge devices 102A, 102B, and 102C at each data center (e.g., including IPSec tunnels between the SD-WAN edge device(s) at each branch and headquarters site) and a security service 120 (e.g., a cloud-based security service, such as provided via Prisma Access, which is a commercially available cloud-based security service from Palo Alto Networks, Inc. headquartered in Santa Clara, CA). This example system diagram is an example deployment for securing traffic from each branch site with one WAN link (Type 1) as shown at 110. SD-WAN Fabric 110 and security service 120 are each in communication with the Internet 140. Security service 120 is in communication with a data store 130 (e.g., a data store for network/security logging data, such as a Cortex™ data lake, which is commercially available from Palo Alto Networks, Inc. headquartered in Santa Clara, CA).

Specifically, this architecture adds SD-WAN devices in regional data centers, along with the SD-WAN devices at each branch and headquarters site. These regional data centers can be public or private cloud environments. SD-WAN devices at the regional data center aggregate network traffic for smaller sites in that region. For example, organizations can use this deployment when there are multiple regional branch sites with lower bandwidth connections to the Internet.

Referring to FIG. 1B, for another example deployment (e.g., branches, headquarters, and regional data center), the IPSec tunnels are set up between the SD-WAN edge device at each data center (e.g., including at SD-WAN devices 102D and 102E) and a security service 120 (e.g., a cloud-based security service, such as provided via Prisma Access, which is a commercially available cloud-based security service from Palo Alto Networks, Inc. headquartered in Santa Clara, CA). This example system diagram is an example deployment for securing SD-WAN deployments with Regional Hub/POP architectures. As shown, the IPSec tunnels are set up between each of the regional data centers or hubs 106A and 106B and the security service 120.

A common network architecture today is to tunnel traffic between an enterprise's headquarters and branches over either MPLS links or dedicated encrypted VPN links. As more services are cloud-based (e.g., including SaaS solutions, such as Microsoft Office 365®, Salesforce®, etc.), and more information is available on the Internet, it generally makes less sense to tunnel traffic back to an aggregation point before routing it to its final destination. Breaking out traffic locally from the branches (e.g., as opposed to an on-premises appliance) generally allows traffic to reach its destination faster and makes a more efficient use of bandwidth. However, allowing traffic directly between devices in the branch and the Internet also introduces new technical security challenges with respect to effectively and efficiently providing a cellular WAN in such SD-WAN routers for these connectivity solutions as similarly described above.

As such, the disclosed techniques for extending local cellular WAN capabilities to a connected device can be performed in these example SD-WAN architectures and a security service as will be further described below with respect to FIG. 2.

Figure 2:
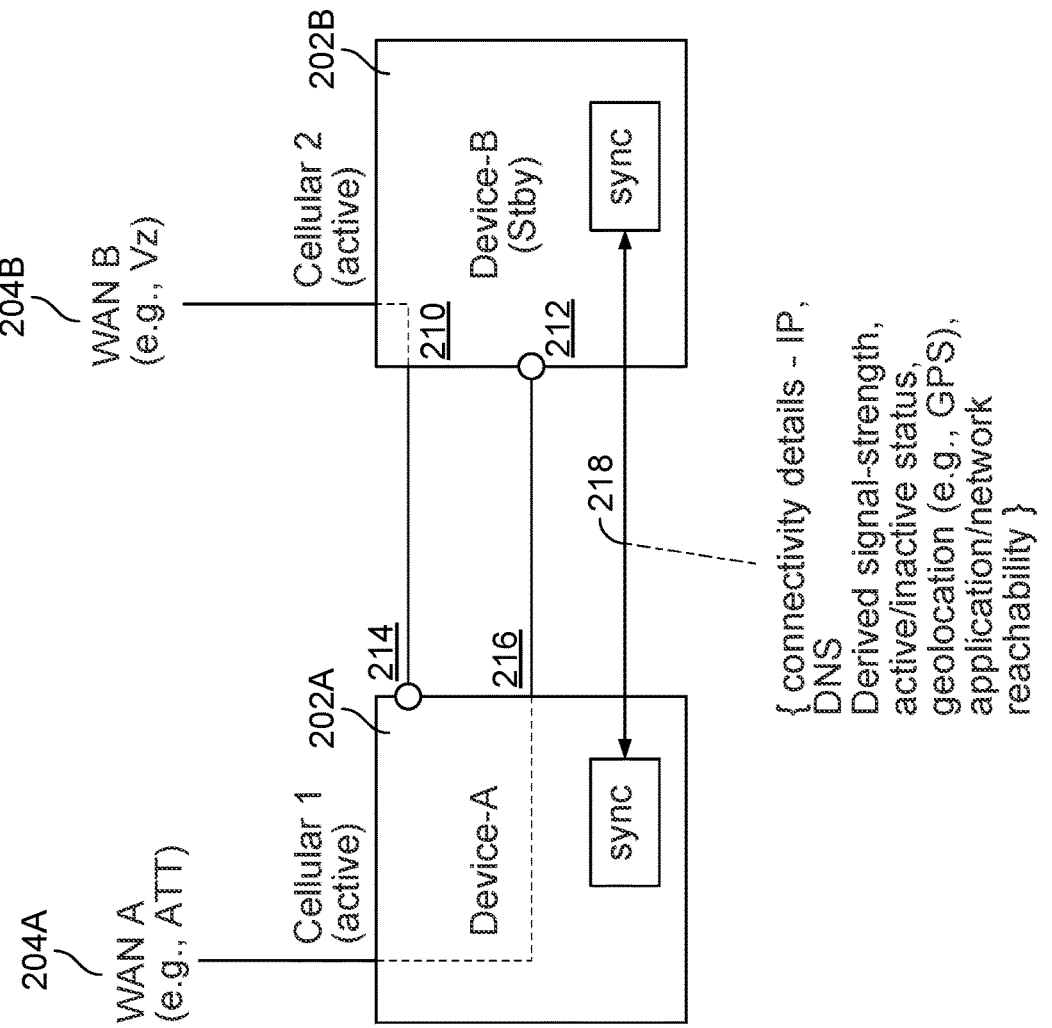
FIG. 2 is a system diagram that illustrates components for extending local cellular WAN capabilities to a connected device with a Device-B serving as an HA pair of a Device-A in accordance with some embodiments.

FIG. 2 is a system diagram that illustrates components for extending local cellular WAN capabilities to a connected device with a Device-B serving as an HA pair of a Device-A in accordance with some embodiments. In this first example use case, Device-A 202A includes a cellular modem that is in active communication with a cellular service provider/carrier for WAN A as shown at 204A (e.g., AT&T cellular network, in which case WAN A includes an AT&T SIM), and Device-B 202B also includes a cellular modem that is in active communication with a cellular service provider/carrier for WAN B as shown at 204B (e.g., Verizon cellular network, in which case WAN B includes a Verizon SIM). In this example use case, Device-A 202A and Device-B 202B are connected via network communication cables (e.g., Ethernet cables and/or other high speed Internet network cables) as shown at 210 and 214 as well as 212 and 216.

As such, the cellular WAN for this SD-WAN platform shown in FIG. 2 facilitates extending Device-A 202A to being able to use either the AT&T cellular WAN A as shown at 204A or the Verizon cellular WAN B as shown at 204B via 210 and 214 (e.g., a cellular bypass pair for routing traffic from Device-A 202A to WAN B 204B). Similarly, the cellular WAN for this SD-WAN platform shown in FIG. 2 facilitates extending Device-B 202B to being able to use either the Verizon cellular WAN B or the AT&T cellular WAN A via 212 and 216 (e.g., another cellular bypass pair for routing traffic from Device-B 202B to WAN A 204A). Further, SD-WAN policy routing can utilize either WAN A or WAN B for various policy-based routing decisions, such as for workflow balancing (e.g., to facilitate various Service Level Agreement (SLA) requirements for different applications, or to provide Quality of Service (QOS) priority to certain traffic such as Voice over IP (VOIP) traffic or intranet traffic versus external social media traffic, etc.), traffic steering policies, etc., as well as for high availability (HA) (e.g., failover) as will now be further described below.

In this example use case scenario, Device-A 202A is in active mode, and Device-B 202B is in standby mode as shown in FIG. 2 (e.g., Device-A 202A is a master node and Device-B 202B is a slave node in this use case scenario) until a switchover is triggered, such as if Device-A 202A fails or loses cellular connectivity, etc., which will be further described below. As such, while Device-A 202A is in active mode, and Device-B 202B is in standby mode, these SD-WAN path selection related policy decisions are performed by Device-A 202A, which then can route traffic and utilize WAN A as shown at 204A (e.g., its local cellular connectivity path) and/or WAN B as shown at 204B (e.g., its extended cellular connectivity path) according to those policy/traffic routing/failover decisions made by Device-A 202A.

As such, the example use case scenario shown in FIG. 2 facilitates bridging of the disparate transports, such as cellular to terrestrial and vice versa. Specifically, the cellular transport is extended over wired line connections between Device-A 202A and Device-B 202B as provided via cellular bypass pairs 210 and 214 as well as 212 and 216 as shown in FIG. 2 while maintaining the cellular capabilities of each respective device to facilitate the disclosed techniques for extending local cellular WAN capabilities to a connected device. Thus, Device-A 202A can send traffic over the directly attached Cellular-1 via WAN A 204A for cellular communications over the AT&T cellular network as well as over the Cellular-2 on Device-B 202B via WAN B 204B by utilizing a port pair as shown at 210 and Cellular-2 (e.g., using cellular bypass pair 210 and 214 as similarly described above).

Specifically, Device-B 202B, having a local cellular modem shown as Cellular 2 for WAN B 204B, controls cellular capabilities (for Cellular-2) including, for example, the following: (1) starting a data session; (2) gathering geolocation (e.g., GPS) information; (3) monitoring radio resources, such as signal strength, noise, cell tower switches; and/or (4) managing SIM switches when two SIMs are available. More specifically, these capabilities are extended from Device-B 202B to Device-A 202A using a new cellular extension for WAN synchronization protocol as shown at 218. As shown at 218, the disclosed cellular extension for WAN synchronization protocol facilitates sharing of various cellular modem and related information including the following: (1) connectivity details, such as IP addresses; (2) DNS information; (3) derived signal-strength metrics; (4) active/inactive status; (5) geolocation (GPS) information; (6) application/network reachability; and/or (7) other information/metrics. Synchronization of this cellular related information facilitates the disclosed techniques for extending local cellular WAN capabilities to a connected device so that, for example, Device-A 202A can utilize the information associated with Cellular-2 (i.e., the cellular modem of Device-B 202B and its own SIM card), which results in a solution that allows Device-A 202A to behave as it includes two cellular modems, both Cellular 1 that is native to Device-A 202A as well as Cellular-2 that is actually native to Device-B 202B. In an example implementation, an SDK and application programming interfaces (APIs) can be utilized to obtain this cellular information from the respective SIM cards that can then be extracted and synchronized between Device-A 202A and Device-B 202B using the cellular extension for WAN synchronization protocol as shown at 218.

In the case of an HA switchover, the disclosed techniques can then be efficiently applied to bypass the traffic on Device-A using the above-described techniques and the disclosed synchronization protocol to share the similar information/metrics for Cellular 1 and the SIM of Device-A 202 with Device-B 202B. As such, HA failover is effectively and efficiently performed for an SD-WAN router that has only a single cellular modem but is extended to the remote cellular modem of another standby device to become the active device, such as if/when the previously active device suffers a failure, cellular network connectivity degradation/loss, or other triggering event, using the above-described techniques (e.g., without the delay of, for example, having to download the firmware of another cellular service provider/carrier to its only cellular modem).

Figure 3:
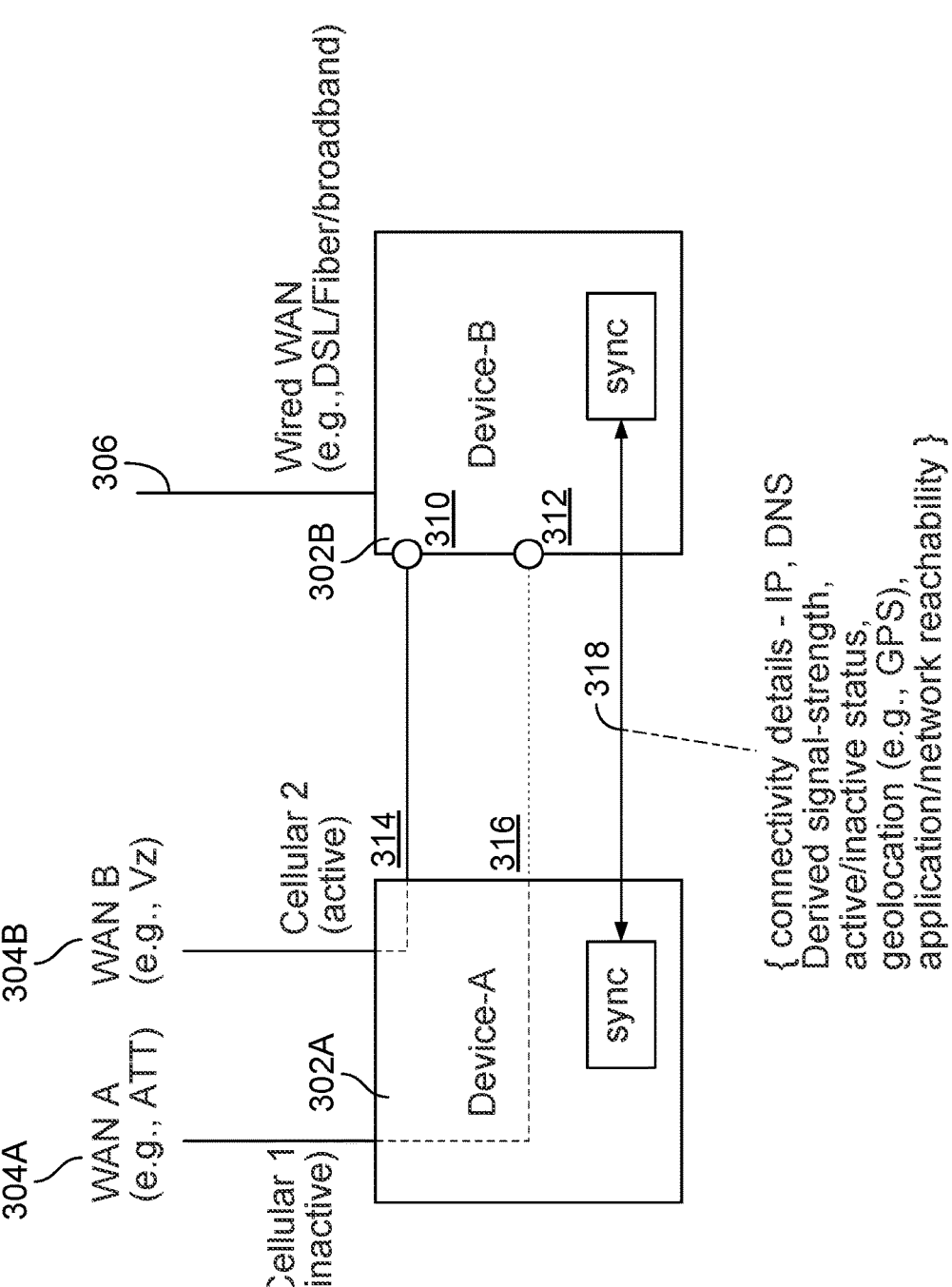
FIG. 3 is a system diagram that illustrates components for extending local cellular WAN capabilities to a connected device with a Device-B without a cellular modem using the cellular capability of a Device-A in accordance with some embodiments.

FIG. 3 is a system diagram that illustrates components for extending local cellular WAN capabilities to a connected device with a Device-B without a cellular modem using the cellular capability of a Device-A in accordance with some embodiments. In this second example use case, Device-A 302A includes a Cellular 1 modem for communication (shown as currently inactive) with a cellular service provider/carrier for WAN A as shown at 304A (e.g., AT&T cellular network, in which case WAN A includes an AT&T SIM), and Device-A 302 also includes a Cellular 2 modem that is shown in active communication with a cellular service provider/carrier for WAN B as shown at 304B (e.g., Verizon cellular network, in which case WAN B includes a Verizon SIM). As also shown in FIG. 3, a Device-B 302B includes a Wired WAN as shown at 306 for communications with a non-cellular, wired network, such as DSL, Fiber, broadband, etc. In this example use case, Device-A 302A and Device-B 302B are connected via network communication cables (e.g., Ethernet cables and/or other high speed Internet network cables) as shown at 310 and 314 as well as 312 and 316 (e.g., cellular bypass pairs, such as similarly described above with respect to FIG. 2).

In this example implementation, Device-A 302A, having a local cellular modem, controls cellular capabilities to provide WAN A 304A and WAN B 304B connectivity. Such capabilities can include the following: (1) starting a data session; (2) gathering geolocation (e.g., GPS) information; (3) monitoring radio resources, such as signal strength, noise, etc.; (4) cell tower switches; and/or (5) managing SIM switches when two SIMs are available.

Further, in this example implementation use case scenario, Device-B 302B is connected physically to Device-A 302A as described above, and intends to use cellular connectivity extended by Device-A 302A. Upon certain cellular connectivity triggers (e.g., starting/stopping data session, learning GPS location, change in signal strength, etc.), Device-A 302A synchronizes cellular information to Device-B 302B. Device-B 302B can now configure its local interface using this information and start using it for, for example, Device-B 302B connectivity. Also, since Device-B 302B is the one that is actively using the connection for data traffic, it can determine application/network reachability over this link. Thus, such information is synchronized back to the Device-A 302A via the cellular extension for WAN synchronization protocol as shown at 318, which can use it to determine whether the other SIM (e.g., different cellular service provider/carrier) should be used, and if so, it starts the new data session and synchronizes new information to Device-B 302B accordingly.

More specifically, in this example use case scenario, cellular bypass pairs 310 and 314 and/or 312 and 316 can be used to provide redundant cellular connectivity for Device-B 302B using the dual SIM cellular capability of Device-A 302A. Specifically, in response to certain cellular connectivity triggers (e.g., starting/stopping a data session, learning a GPS location, a change in signal strength, a failure of a SIM, a loss of cellular connectivity or other network performance degradation, etc.), Device-A synchronizes (sync) cellular information to Device-B using the cellular extension for WAN synchronization protocol as shown at 318, such as similarly described above with respect to FIG. 2 (e.g., using an SDK and application programming interfaces (APIs) to obtain this cellular information from the respective SIM cards that can then be extracted and synchronized between Device-A 302A and Device-B 302B using the cellular extension for WAN synchronization protocol as shown at 318).

As such, Device-B 302B utilizes this synchronized cellular related information for determining an application/network reachability for performing SD-WAN path selection. Also, Data Policy information is synchronized back to Device-A 302A, which can use it to determine whether a second SIM (e.g., a different cellular service provider/carrier, such as detecting that Microsoft Office 365 SaaS traffic over Verizon Wireless^SM over WAN B 304B is not reachable, then SD-WAN path selection can be performed by Device-A 302A to switch over to the AT&T network over WAN A 304A) should be used, and if so, then Device-A 302A starts the new data session and syncs new information to Device-B 302B accordingly.

FIG. 4 is a screen diagram that illustrates an example scenario for extending local cellular WAN capabilities to a connected device in accordance with some embodiments. Referring to FIG. 4, the network connection activities of a Device-A are shown on the left side of the screen at 402, and the network connection activities of a Device-B are shown on the right side of the screen at 404. In this example scenario (e.g., which is similar to the first use case discussed above with respect to FIG. 2), pings to IP address 1.1.1.1 are sent directly over the attached cellular link on Device-A. In contrast, pings to IP address 8.8.8.8 are directed by Device-A to be sent over interface 2 to Device-B's interface 1 based on a path policy configured in this example scenario (i.e., configured SD-WAN path selection policy/rules). Specifically, in this example scenario, Device-B has a cellular bypass-pair between interface 1 and its own cellular link. As such, pings to 8.8.8.8 coming in on interface 1 of Device-B traverse the bypass-pair and come out of the cellular link attached to Device-B. Moreover, Device-A is able to use its own cellular link as well as the cellular link of Device-B simultaneously.

As will now be apparent to one of ordinary skill in the art in view of the disclosed embodiments, various other topologies can be similarly provided using the disclosed techniques for extending local cellular WAN capabilities to a connected device (e.g., and using the cellular extension for WAN synchronization protocol) to facilitate effective and efficient SD-WAN solutions.

Moreover, in both of the above-described use cases in FIGS. 2 and 3, the synchronization between the different WANs is mutual to facilitate SD-WAN path selection based on various network capacity, bandwidth, application/network reachability, and/or other metrics/criteria as similarly described above with respect to various embodiments.

Accordingly, the disclosed system embodiment facilitates various advantages. For example, this allows a device to use another device's cellular modem with many native cellular features, as if the modem is present on the local device. Also, when used in high availability (HA) settings, this solution allows the use of two cellular carriers simultaneously even though a single device only has one radio (e.g., it allows for reusing existing SKUs and the software instead of investing in a new platform with a dual radio). Further, SD-WAN routers on the branch network can take advantage of this mechanism to improve WAN redundancy.

Figure 5A:
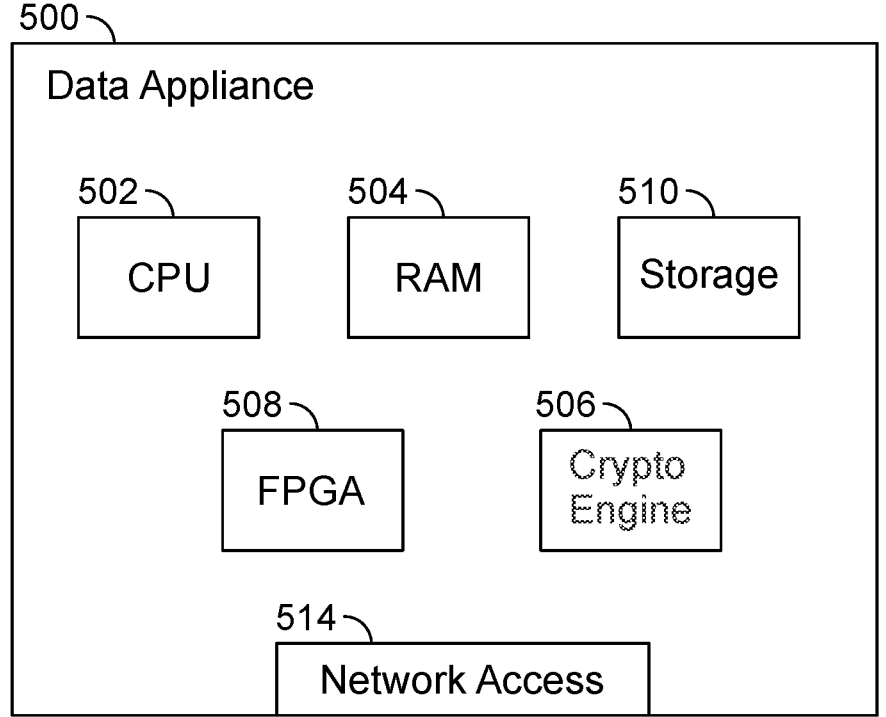
FIG. 5A illustrates an embodiment of a network gateway in accordance with some embodiments.

An embodiment of a network gateway 500 is shown in FIG. 5A (e.g., such as network gateways/SD-WAN edge devices shown at 102A-C in FIGS. 1A-1B). The example shown is a representation of physical components that can be included in network gateways/SD-WAN edge devices shown at 102A-C in FIGS. 1A-1B if the network gateway is implemented as a data appliance, in various embodiments. Specifically, the data appliance includes a high-performance multi-core Central Processing Unit (CPU) 502 and Random Access Memory (RAM) 504. The data appliance also includes a storage 510 (e.g., one or more hard disks or solid-state storage units). In various embodiments, the data appliance stores (e.g., whether in RAM 504, storage 510, and/or other appropriate locations) information that is used in monitoring an enterprise network and implementing the disclosed techniques, such as for SD-WAN path selection as similarly described above with respect to FIGS. 1A-4. Examples of such information can also include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 506 configured to perform encryption and decryption operations, and one or more Field Programmable Gate Arrays (FPGAs) 508 configured to perform matching, act as network processors, and/or perform other tasks. The data appliance also includes a network access 514, which can include wired/wireless access including a dual SIM single radio SD-WAN solution as similarly described above, for example, with respect to FIG. 2.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; Microsoft Office 365 related traffic; and so on.

The disclosed system processing architecture can be used with distinct types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 5B:
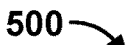
FIG. 5B is a functional diagram of logical components of an embodiment of a data appliance.

FIG. 5B is a functional diagram of logical components of an embodiment of a data appliance. The example shown is a representation of logical components that can be included in network gateway 500 in various embodiments (e.g., such as network gateways/SD-WAN edge devices shown at 102A-C in FIGS. 1A-1B). Unless otherwise specified, various logical components of network gateway 500 are generally implementable in a variety of ways, including as a set of one or more scripts (e.g., written in Go, Java, Python, etc., as applicable).

As shown, network gateway 500 comprises a firewall, and includes a management plane 532 and a data plane 534. The management plane is responsible for managing user interactions, such as by providing a user interface for configuring policies and viewing log data. The data plane is responsible for managing data, such as by performing packet processing and session handling.

Network processor 536 is configured to receive packets from various client devices (e.g., such as client devices at branch/remote offices), and provide them to data plane 534 for processing. Whenever flow module 538 identifies packets as being part of a new session, it creates a new session flow. Subsequent packets will be identified as belonging to the session based on a flow lookup. If applicable, SSL decryption is applied by SSL decryption engine 540. Otherwise, processing by SSL decryption engine 540 is omitted. Decryption engine 540 can help network gateway 500 inspect and control SSL/TLS and SSH encrypted traffic, and thus help to stop threats that might otherwise remain hidden in encrypted traffic. Decryption engine 540 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control distinct options for sessions controlled by the policy. For example, the use of specific cipher suites and encryption protocol versions can be required.

Application identification (APP-ID) engine 542 is configured to determine what type of traffic a session involves. As one example, application identification engine 542 can recognize a GET request in received data and conclude that the session requires an HTTP decoder. In some cases, e.g., a web browsing session, the identified application can change, and such changes will be noted by network gateway 500. For example, a user may initially browse to a corporate Wiki (classified based on the URL visited as "Web Browsing-Productivity") and then subsequently browse to a social networking site (classified based on the URL visited as "Web Browsing-Social Networking"). Distinct types of protocols have corresponding decoders.

Based on the determination made by application identification engine 542, the packets are sent, by decoder 544, to an appropriate decoder configured to assemble packets (e.g., which may be received out of order) into the correct order, perform tokenization, and extract out information. Decoder 544 also performs signature matching to determine what should happen to the packet. As needed, SSL encryption engine 546 can re-encrypt decrypted data. Packets are forwarded using a forward module 548 for transmission (e.g., to a destination).

As also shown in FIG. 5B, policies 550 are received and stored in management plane 532. Policies 550 can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. As another example, policies 550 can include various SD-WAN path selection policies/rules, such as similarly described above with respect to FIGS. 1A-4. An interface (I/F) communicator 552 is provided for management communications (e.g., via (REST) APIs including APIs for performing the above-described cellular extension for WAN synchronization protocol, messages, or network protocol communications or other communication mechanisms).

Example process embodiments for extending local cellular WAN capabilities to a connected device will now be described below.

Example Process Embodiments for Extending Local Cellular WAN Capabilities to a Connected Device FIG. 6 is a flow diagram illustrating a process for extending local cellular WAN capabilities to a connected device for a security service in accordance with some embodiments. In one embodiment, process 600 is performed using the system architectures described above (e.g., such as described above with respect to FIGS. 1A-5B).

The process begins at 602 at which selecting a first network communication device associated with a software-defined wide area network (SD-WAN) for policy enforcement is performed. For example, the security service can be a cloud-based security service, such as similarly described above with respect to FIGS. 1A-1B.

At 604, monitoring cellular network status information associated with a second network communication device of the SD-WAN is performed. For example, the monitored cellular network status information can include the following: (1) connectivity details, such as IP addresses; (2) DNS information; (3) derived signal-strength metrics; (4) active/inactive status; (5) geolocation (GPS) information; (6) application/network reachability; and/or (7) other information/metrics, such as similarly described above with respect to FIGS. 2-4.

At 606, synchronizing the cellular network status information associated with the second network communication device of the SD-WAN with the first network communication device associated with the SD-WAN is performed. For example, the first network communication device associated with the SD-WAN uses the network status information for policy enforcement, and the cellular network status information can be synchronized (in both directions) between the first and second network communication devices of the SD-WAN using the cellular extension for WAN synchronization protocol, such as similarly described above with respect to FIGS. 2-4.

FIG. 7 is another flow diagram illustrating a process for extending local cellular WAN capabilities to a connected device for a security service in accordance with some embodiments. In one embodiment, process 700 is performed using the system architectures described above (e.g., such as described above with respect to FIGS. 1A-5B).

The process begins at 702 at which selecting a first network communication device associated with a software-defined wide area network (SD-WAN) for policy enforcement is performed. For example, the security service can be a cloud-based security service as similarly described above with respect to FIGS. 1A-1B.

At 704, monitoring cellular network status information associated with a second network communication device of the SD-WAN is performed. For example, the monitored cellular network status information can include the following: (1) connectivity details, such as IP addresses; (2) DNS information; (3) derived signal-strength metrics; (4) active/inactive status; (5) geolocation (GPS) information; (6) application/network reachability; and/or (7) other information/metrics, such as similarly described above with respect to FIGS. 2-4.

At 706, synchronizing the cellular network status information associated with the second network communication device of the SD-WAN with the first network communication device associated with the SD-WAN is performed. For example, the first network communication device associated with the SD-WAN uses the network status information for policy enforcement, and the cellular network status information can be synchronized (in both directions) between the first and second network communication devices of the SD-WAN using the cellular extension for WAN synchronization protocol, such as similarly described above with respect to FIGS. 2-4.

At 708, a failover is performed from the second network communication device of the SD-WAN to the first network communication device associated with the SD-WAN. For example, an effective and efficient failover for a dual SIM single radio SD-WAN solution can be performed, such as similarly described above with respect to FIG. 2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
select a first network communication device associated with an SD-WAN for policy enforcement, wherein the policy enforcement includes SD-WAN path selection;
monitor cellular network status information associated with a second network communication device of the SD-WAN; and
synchronize the cellular network status information associated with the second network communication device of the SD-WAN with the first network communication device associated with the SD-WAN, wherein the first network communication device associated with the SD-WAN uses the network status information for the policy enforcement, wherein the first network communication device associated with the SD-WAN includes a dual SIM and single radio for cellular network access, and wherein the second network communication device associated with the SD-WAN includes a non-cellular network communication access, and wherein the second network communication device can utilize cellular access via the first network communication device, and wherein the SD-WAN path selection is based at least in part on application/network reachability; and
a memory coupled to the processor and configured to provide the processor with instructions.

2. The system of claim 1, wherein the policy enforcement includes routing of traffic associated with the first network communication device associated with the SD-WAN.

3. The system of claim 1, wherein the policy enforcement includes traffic steering of traffic associated with the first network communication device associated with the SD-WAN.

4. The system of claim 1, wherein the policy enforcement includes monitoring traffic associated with the first network communication device associated with the SD-WAN and the second network communication device associated with the SD-WAN for a cloud security service.

5. The system of claim 1, wherein the first network communication device associated with the SD-WAN and the second network communication device associated with the SD-WAN are a high availability (HA) pair.

6. The system of claim 1, wherein the first network communication device associated with the SD-WAN and the second network communication device associated with the SD-WAN are a high availability (HA) pair for the SD-WAN, wherein the second network communication device is in a standby mode for the first network communication device.

7. The system of claim 1, wherein the first network communication device associated with the SD-WAN and the second network communication device associated with the SD-WAN are a high availability (HA) pair for the SD-WAN, wherein the second network communication device is in a standby mode for the first network communication device, wherein the first network communication device includes a first cellular radio, and wherein the second network communication device includes a second cellular radio.

8. The system of claim 1, wherein the SD-WAN path selection is based at least in part on application/network reachability.

9. The system of claim 1, wherein the processor is further configured to:
synchronize network status information associated with the first network communication device associated with the SD-WAN with the second network communication device associated with the SD-WAN.

10. A method, comprising:
selecting a first network communication device associated with an SD-WAN for policy enforcement, wherein the policy enforcement includes SD-WAN path selection;
monitoring cellular network status information associated with a second network communication device of the SD-WAN; and
synchronizing the cellular network status information associated with the second network communication device of the SD-WAN with the first network communication device associated with the SD-WAN, wherein the first network communication device associated with the SD-WAN uses the network status information for the policy enforcement, wherein the first network communication device associated with the SD-WAN includes a dual SIM and single radio for cellular network access, and wherein the second network communication device associated with the SD-WAN includes a non-cellular network communication access, and wherein the second network communication device can utilize cellular access via the first network communication device, and wherein the SD-WAN path selection is based at least in part on application/network reachability.

11. The method of claim 10, wherein the policy enforcement includes routing of traffic associated with the first network communication device associated with the SD-WAN.

12. The method of claim 10, wherein the policy enforcement includes traffic steering of traffic associated with the first network communication device associated with the SD-WAN.

13. The method of claim 10, wherein the first network communication device associated with the SD-WAN and the second network communication device associated with the SD-WAN are a high availability (HA) pair.

14. The method of claim 10, wherein the first network communication device associated with the SD-WAN and the second network communication device associated with the SD-WAN are a high availability (HA) pair for the SD-WAN, wherein the second network communication device is in a standby mode for the first network communication device.

15. A computer program product embodied in a non-transitory computer readable medium and comprising computer instructions for:

selecting a first network communication device associated with an SD-WAN for policy enforcement, wherein the policy enforcement includes SD-WAN path selection;

monitoring cellular network status information associated with a second network communication device of the SD-WAN; and synchronizing the cellular network status information associated with the second network communication device of the SD-WAN with the first network communication device associated with the SD-WAN, wherein the first network communication device associated with the SD-WAN uses the network status information for the policy enforcement, wherein the first network communication device associated with the SD-WAN includes a dual SIM and single radio for cellular network access, and wherein the second network communication device associated with the SD-WAN includes a non-cellular network communication access, and wherein the second network communication device can utilize cellular access via the first network communication device, and wherein the SD-WAN path selection is based at least in part on application/network reachability.

16. The computer program product of claim 15, wherein the policy enforcement includes routing of traffic associated with the first network communication device associated with the SD-WAN.

17. The computer program product of claim 15, wherein the policy enforcement includes traffic steering of traffic associated with the first network communication device associated with the SD-WAN.

18. The computer program product of claim 15, wherein the first network communication device associated with the SD-WAN and the second network communication device associated with the SD-WAN are a high availability (HA) pair.

19. The computer program product of claim 15, wherein the first network communication device associated with the SD-WAN and the second network communication device associated with the SD-WAN are a high availability (HA) pair for the SD-WAN, wherein the second network communication device is in a standby mode for the first network communication device.

20. The method of claim 10, wherein the SD-WAN path selection is based at least in part on application/network reachability.

* * * * *